Jan. 29, 1935.  W. S. SMITH ET AL  1,989,563
ELECTRICAL INSULATING MATERIAL
Filed Feb. 25, 1930
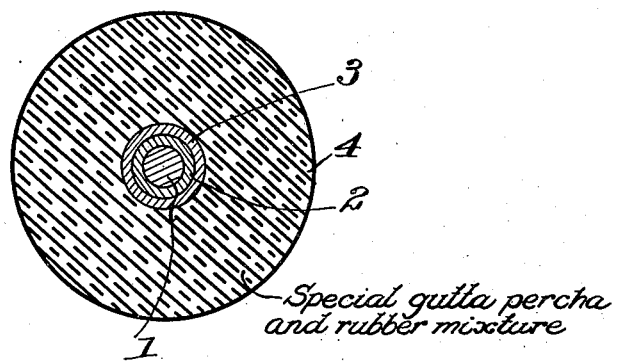
INVENTORS,
W. S. Smith,
H. J. Garnett,
H. C. Channon and
J. N. Dean,
BY Baldwin Wright
THEIR ATTORNEYS.

Patented Jan. 29, 1935

1,989,563

UNITED STATES PATENT OFFICE 1,989,563

ELECTRICAL INSULATING MATERIAL

Willoughby Statham Smith, Benchams, Henry Joseph Garnett, Lymne, Henry Charles Channon, South Kensington, London, and John Norman Dean, Kincraig, England Application February 25, 1930, Serial No. 431,330 In Great Britain February 28, 1929

8 Claims. (Cl. 173—264)

This invention relates to the manufacture of an electrical insulating material, suitable for use on telephone or other signalling cable, and comprising gutta percha and/or balata possessing a low leakance of under about 2 micro-micromhos per cm.$^3$ at 1000 cycles and at 75° F. or a corresponding leakance of under about 6 micromicromhos per cm.$^3$ at 2000 cycles and 32° F. obtained by subjecting the gutta percha and/or balata to a purifying treatment to remove the resins and dirt impurities.

An insulation such as described above forms the subject matter of prior Patent No. 1,912,548 of Willoughby Statham Smith et al. and the present invention is an improvement in or modification of the invention described therein.

The electrical properties of purified gutta percha are shown by the following table:—

|  | Original values | |
| --- | --- | --- |
|  | Dielectric constant | Leakance—micromicromhos per cm.$^3$ |
| Ordinary cable mix | 3.3 | 60-100 |
| Same after removal of resin only | 2.9 | 6-10 |
| Same after removal of resin and dirt | 2.6 | 5-6 |

All the above values measured at 32° F. and 2000 cycles.

We are aware that it has been previously proposed to purify gutta percha for insulation purposes by removal only of the resin and to mix therewith for reducing hardness rubber or synthetic rubber up to 75%. Such mixture used as insulating material for submarine cables becomes useless however, after immersion in water for any substantial length of time owing to the fact that its electrical properties become excessively impaired, i. e. its leakance value rises high above its original value.

Now it is well known that the ordinary rubber of commerce contains besides rubber hydrocarbons, a number of non-rubber bodies, e. g. proteins, esters and glucosides, which have the effect of causing the rubber, when immersed in water gradually to absorb water as time goes on, with the consequent deterioration of its electrical properties and characteristics, as will be seen from the following figures.

|  | Original values | | After 3 months in water | |
| --- | --- | --- | --- | --- |
|  | Dielectric constant | Leakance micromicromhos per cm.$^3$ | Dielectric constant | Leakance micromicromhos per cm.$^3$ |
| Crepe rubber | 2.2-2.4 | 5-12 | Leakance of the order of several hundreds, actual value varying with sample. Dielectric constant also very high. | |

It has now been found that by removing the dirt, together with the resins from the gutta percha and thus obtaining a substantially protein free body it is possible to incorporate ordinary or natural raw rubber containing its normally harmful non-rubber bodies, with this purified gutta percha without affecting the permanency of the electrical properties of the material.

According to the present invention a submarine telephone or other signalling cable has an insulation comprising dirt and resin free gutta percha and/or balata with which is intimately admixed rubber or like synthetic rubber, for example, polymerization products of certain unsaturated hydrocarbons with a conjugated system of linkage, e. g. isoprene, butadiene.

*Example.*—A mixture of equal quantities of ordinary crepe rubber and of gutta percha from which has been removed substantially the whole of the resins and the dirt including the impurities derived from the latex and sap removable only by dissolution of the gutta hydrocarbon in a solvent and mechanical separation of said impurities from the solution and not removable by prolonged washing by the process described in copending application Serial No. 322,572 now Patent 1,912,548 dated June 6, 1933 was made and tested electrically both before and after prolonged immersion in water. The results are shown in the following table:—

|  | Original values | | After 3 months in water | |
|---|---|---|---|---|
|  | Dielectric constant | Leakance micro-micromhos per cm.³ | Dielectric constant | Leakance micro-micromhos per cm.³ |
| Mixture of equal proportions of crepe rubber and dirt and resin-free gutta percha | 2.7 | 5-6 | 2.9 | 5-6 |

The above values were measured at 32° F. and 2000 cycles.

Substantially similar results are obtained with a like mixture containing only 25% rubber.

The proportion of rubber in the mixture will generally depend upon the softness of the insulation required, but it should preferably not exceed 50%. When a relatively small percentage of rubber is admixed it may be advisable or necessary to heat treat the purified gutta percha in the manner described in copending application Serial No. 413,398, now Patent No. 1,978,868 dated October 30, 1934.

The invention is illustrated in the accompanying drawing wherein the view is a cross-section through the core of a continuously loaded conductor. In the drawing, 1 is a central conductor, 2 the copper tapes wound on the conductor, 3 the loading material, and 4 is a layer of special mixture of gutta percha and rubber. By "special mixture" is meant a mixture of gutta percha and rubber as disclosed in the specification and defined in the claims.

In some cases the purified gutta percha and/or balata may be employed with the rubber in a composite layered dielectric. The materials may be mixed in the usual manner in a rubber mill.

What we claim is:—

1. In a signalling conductor, the combination of a core and insulating material comprising a mixture including gutta percha from which has been removed substantially the whole of the resins and the dirt including the impurities derived from the latex and sap removable only by dissolution of the gutta hydrocarbon in a solvent and mechanical separation of said impurities from the solution and not removable by prolonged washing, and rubber having a substantial normally water-insoluble protein content.

2. In a signalling conductor, the combination of a core and insulating material comprising gutta percha from which has been removed substantially the whole of the resins and the dirt including the impurities derived from the latex and sap removable only by dissolution of the gutta hydrocarbon in a solvent and mechanical separation of said impurities from the solution and not removable by prolonged washing, admixed with from twenty-five to fifty per cent of rubber which includes a substantial amount of normally water-insoluble protein.

3. In a submarine signalling conductor, the combination of a core and insulating material applied thereto and having a dielectric constant and leakance substantially unchanged after prolonged immersion in water, said insulating material comprising a mixture including gutta percha from which has been removed substantially the whole of the resins and the dirt including the impurities derived from the latex and sap removable only by dissolution of the gutta hydrocarbon in a solvent and mechanical separation of said impurities from the solution and not removable by prolonged washing, and rubber having a substantial normally water-insoluble protein content.

4. In a signalling conductor, the combination of a core and insulating material comprising a mixture including gutta percha from which has been removed substantially the whole of the resins and the dirt including the impurities derived from the latex and sap removable only by dissolution of the gutta hydrocarbon in a solvent and mechanical separation of said impurities from the solution and not removable by prolonged washing, and rubber having a substantial normally water-insoluble protein content, the rubber content not exceeding fifty per cent.

5. In a signalling conductor, the combination of a core and insulating material comprising a mixture including gutta percha from which has been removed substantially the whole of the resins and the dirt including the impurities derived from the latex and sap removable only by dissolution of the gutta hydrocarbon in a solvent and mechanical separation of said impurities from the solution and not removable by prolonged washing, and rubber having a substantial normally water-insoluble protein content, the rubber content being approximately twenty-five per cent.

6. Insulating material comprising a mixture including gutta percha from which has been removed substantially the whole of the resins and the dirt including the impurities derived from the latex and sap removable only by dissolution of the gutta hydrocarbon in a solvent and mechanical separation of said impurities from the solution and not removable by prolonged washing, and rubber having a substantial normally water-insoluble protein content.

7. Insulating material comprising a mixture including gutta percha from which has been removed substantially the whole of the resins and the dirt including the impurities derived from the latex and sap removable only by dissolution of the gutta hydrocarbon in a solvent and mechanical separation of said impurities from the solution and not removable by prolonged washing, and rubber having a substantial normally water-insoluble protein content, the rubber content being between about twenty-five per cent and about fifty per cent.

8. Insulating material comprising a mixture including gutta percha substantially free from dirt including the impurities derived from the latex and sap removable only by dissolution of the gutta hydrocarbon in a solvent and mechanical separation of said impurities from the solution and not removable by prolonged washing, and rubber having a substantial normally water insoluble protein content.

WILLOUGHBY STATHAM SMITH.
HENRY JOSEPH GARNETT.
HENRY CHARLES CHANNON.
JOHN NORMAN DEAN.